(12) United States Patent
Sendelbach et al.

(10) Patent No.: US 9,751,487 B2
(45) Date of Patent: Sep. 5, 2017

(54) SIDE AIRBAG FOR MOTOR VEHICLES

(71) Applicant: TAKATA AG, Aschaffenburg (DE)

(72) Inventors: Hans-Peter Sendelbach, Senden (DE); Uwe Dierks, Erkner (DE)

(73) Assignee: TAKATA AG, Aschaffenburg (DE)

( * ) Notice: Subject to any disclaimer, the term of this patent is extended or adjusted under 35 U.S.C. 154(b) by 0 days.

(21) Appl. No.: 14/654,191

(22) PCT Filed: Dec. 19, 2013

(86) PCT No.: PCT/EP2013/077508
§ 371 (c)(1),
(2) Date: Jun. 19, 2015

(87) PCT Pub. No.: WO2014/096266
PCT Pub. Date: Jun. 26, 2014

(65) Prior Publication Data
US 2015/0353045 A1  Dec. 10, 2015

(30) Foreign Application Priority Data

Dec. 21, 2012 (DE) .................. 10 2012 224 178

(51) Int. Cl.
*B60R 21/207* (2006.01)
*B60R 21/233* (2006.01)
(Continued)

(52) U.S. Cl.
CPC .......... *B60R 21/207* (2013.01); *B60R 21/231* (2013.01); *B60R 21/233* (2013.01);
(Continued)

(58) Field of Classification Search
CPC ............ B60R 21/207; B60R 21/23138; B60R 21/233; B60R 21/264; B60R 2021/23146; B60R 2021/23308
See application file for complete search history.

(56) References Cited

U.S. PATENT DOCUMENTS 5,895,070 A * 4/1999 Lachat ................. B60R 21/207
280/729
5,944,342 A * 8/1999 White, Jr. ............... B60R 21/23
280/729

(Continued)

FOREIGN PATENT DOCUMENTS

DE        100 38 088 A1    2/2002
DE   1020040 06 320 A1    9/2005
(Continued)

OTHER PUBLICATIONS

International Search Report dated Jun. 11, 2014 issued in PCT/EP2013/077508.

*Primary Examiner* — Faye M Fleming
(74) *Attorney, Agent, or Firm* — Gordon & Rees LLP

(57) ABSTRACT

A side airbag for motor vehicles is provided. The side airbag comprises a gas bag which is to be arranged as intended on a vehicle seat, so that, in order to protect a vehicle occupant situated on the vehicle seat, it can be deployed laterally beside the vehicle occupant, and a gas generator for filling the gas bag with a gas, so that the same deploys. The gas bag and the gas generator are configured and provided to be arranged on the vehicle seat such that in the deployed state the gas bag supports itself on a backrest frame of the vehicle seat.

14 Claims, 9 Drawing Sheets

(51) Int. Cl.
*B60R 21/231* (2011.01)
*B60R 21/264* (2006.01)
*B60R 21/2334* (2011.01)
*B60N 2/58* (2006.01)
*B60R 21/261* (2011.01)

(52) U.S. Cl.
CPC .... *B60R 21/2334* (2013.01); *B60R 21/23138* (2013.01); *B60R 21/264* (2013.01); *B60N 2002/5808* (2013.01); *B60R 2021/23146* (2013.01); *B60R 2021/23308* (2013.01); *B60R 2021/2612* (2013.01)

(56) References Cited

U.S. PATENT DOCUMENTS

| | | |
|---|---|---|
| 6,966,576 B1 | 11/2005 | Greenstein |
| 7,976,058 B2 | 7/2011 | Suzuki et al. |
| 8,047,564 B2 | 11/2011 | Kibat et al. |
| 8,905,433 B2 * | 12/2014 | Scott ............... B60R 21/207 280/736 |
| 2005/0236819 A1 | 10/2005 | Riedel et al. |
| 2006/0038386 A1 * | 2/2006 | Shibayama ....... B60R 21/23138 280/730.2 |
| 2006/0255572 A1 | 11/2006 | Svenbrandt et al. |
| 2008/0129020 A1 | 6/2008 | Bostrom et al. |
| 2008/0129024 A1 | 6/2008 | Suzuki et al. |
| 2009/0014990 A1 * | 1/2009 | Loibl ............... B60R 21/207 280/730.2 |
| 2009/0134607 A1 * | 5/2009 | Okuhara ........... B60R 21/2171 280/728.2 |
| 2010/0090448 A1 | 4/2010 | Pursche et al. |
| 2011/0169250 A1 | 7/2011 | Breuninger et al. |
| 2011/0298201 A1 * | 12/2011 | Kobayashi ......... B60R 21/207 280/736 |
| 2012/0038135 A1 * | 2/2012 | Oomori ......... B60R 21/23138 280/730.2 |
| 2012/0049498 A1 | 3/2012 | Wiik et al. |
| 2012/0187664 A1 * | 7/2012 | Messina ............. B60R 21/207 280/728.2 |
| 2015/0151711 A1 * | 6/2015 | Fujiwara ........... B60R 21/207 280/728.2 |
| 2015/0166003 A1 * | 6/2015 | Fujiwara ........... B60R 21/207 280/730.2 |

FOREIGN PATENT DOCUMENTS

| | | | |
|---|---|---|---|
| DE | 10 2004 020 643 A1 | 11/2005 | |
| DE | 10 2005 025 553 A1 | 12/2006 | |
| DE | 10 2005 059 197 B4 | 4/2008 | |
| DE | 10 2007 057 016 A1 | 5/2009 | |
| DE | 10 2009 014 103 A1 | 10/2009 | |
| DE | 10 2008 033 714 A1 | 1/2010 | |
| DE | 10 2008 052 479 A1 | 4/2010 | |
| DE | 10 2008 053 080 A1 | 4/2010 | |
| DE | 10 2011 081 478 A1 | 3/2012 | |
| EP | 0 818 365 | 1/1998 | |
| JP | 2008-207661 A | 9/2008 | |
| JP | 2012071723 A * | 4/2012 | ........ B60R 21/207 |
| JP | 2013203368 A * | 10/2013 | ........ B60R 21/207 |
| WO | WO-2012/060574 A2 | 5/2012 | |

\* cited by examiner

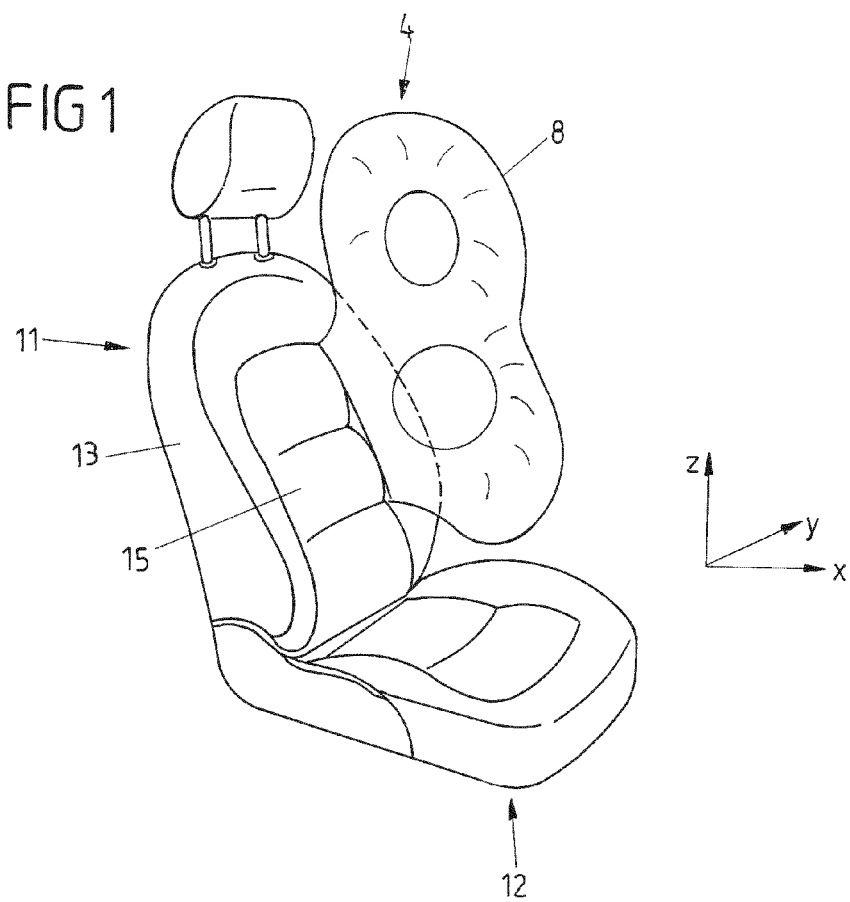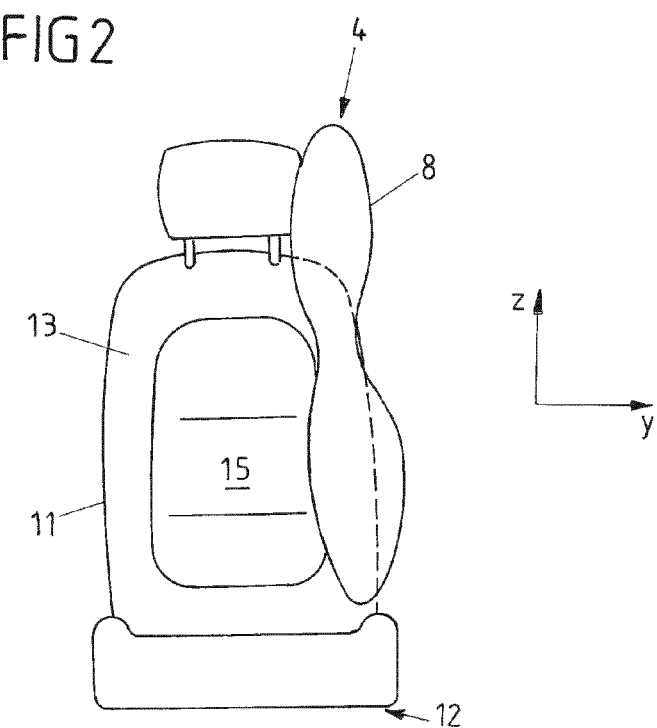

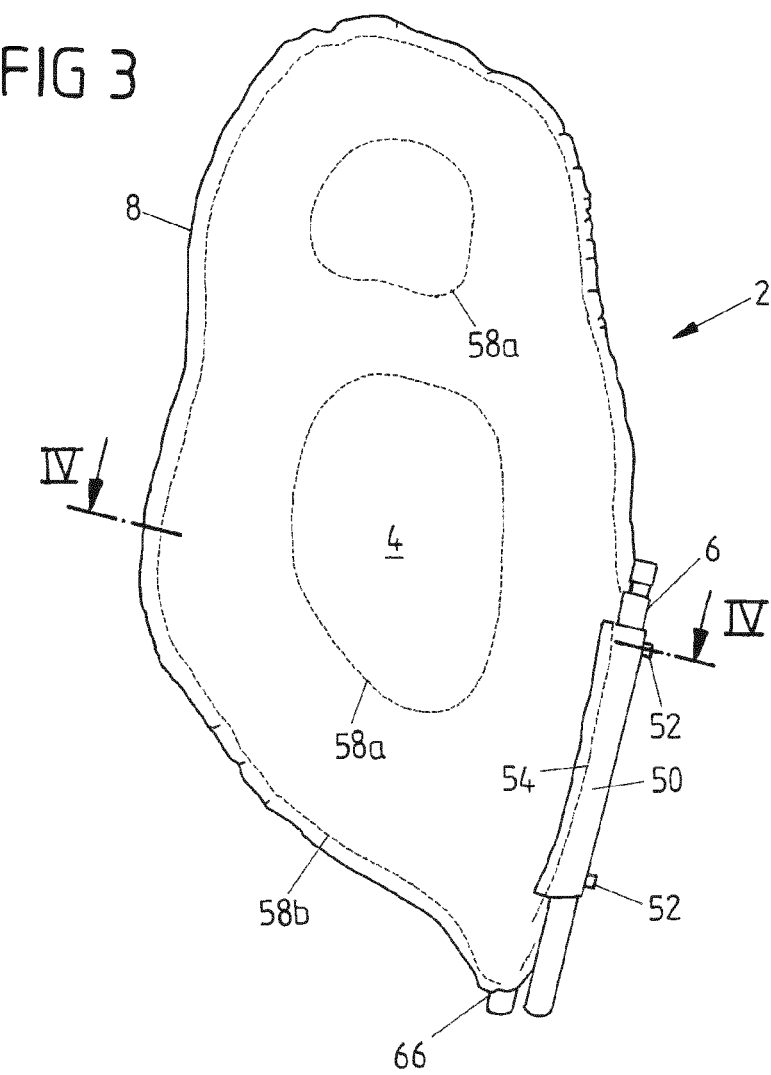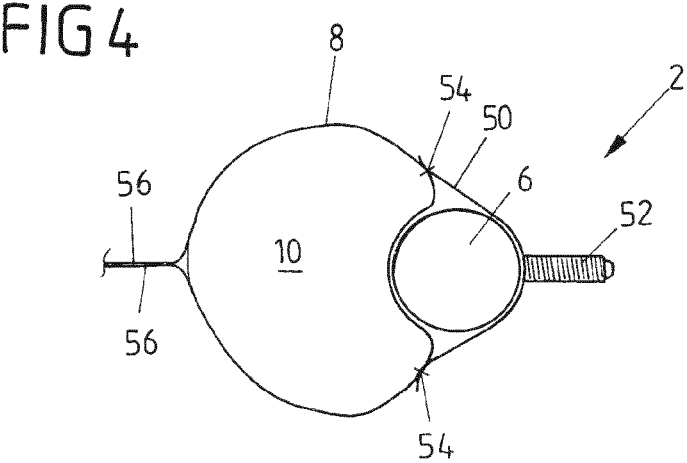

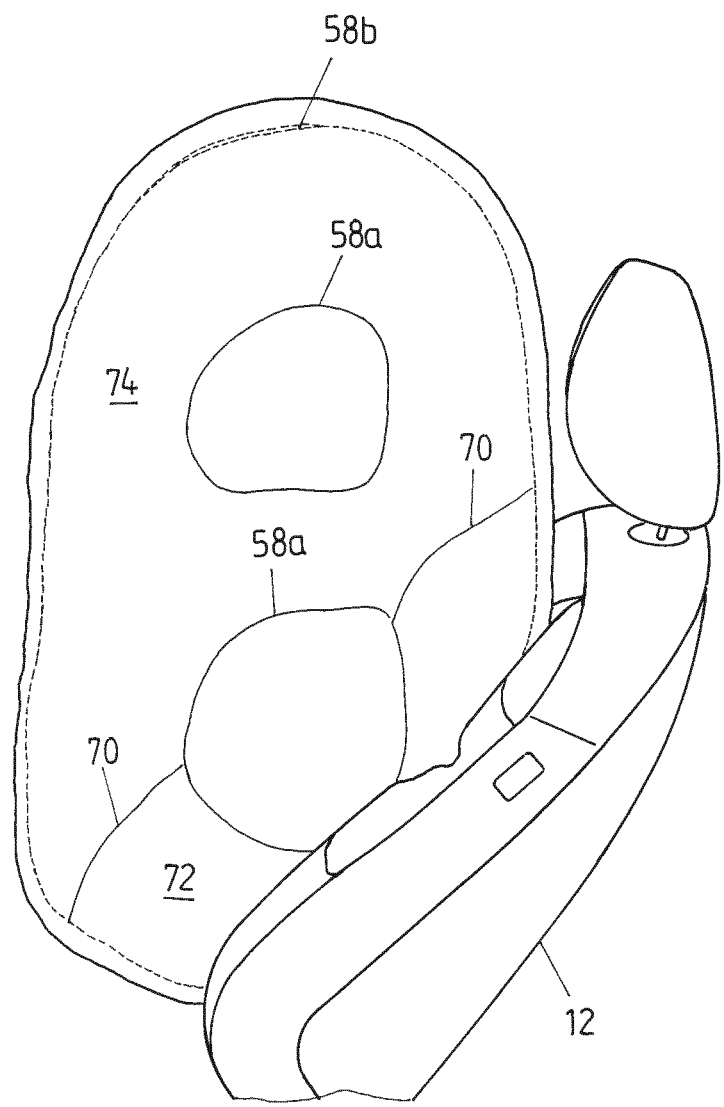

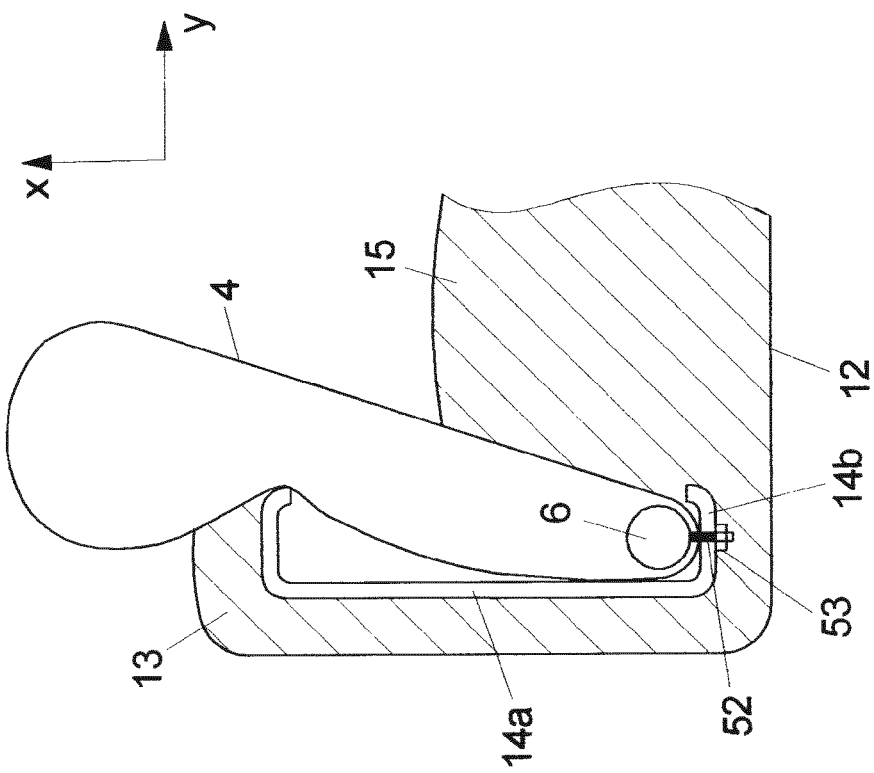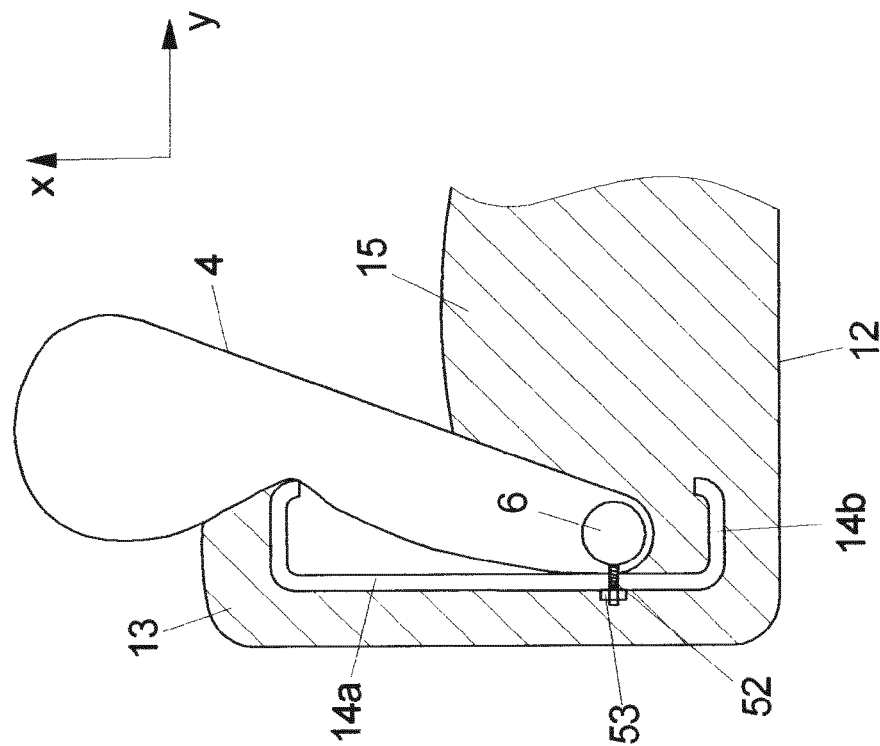

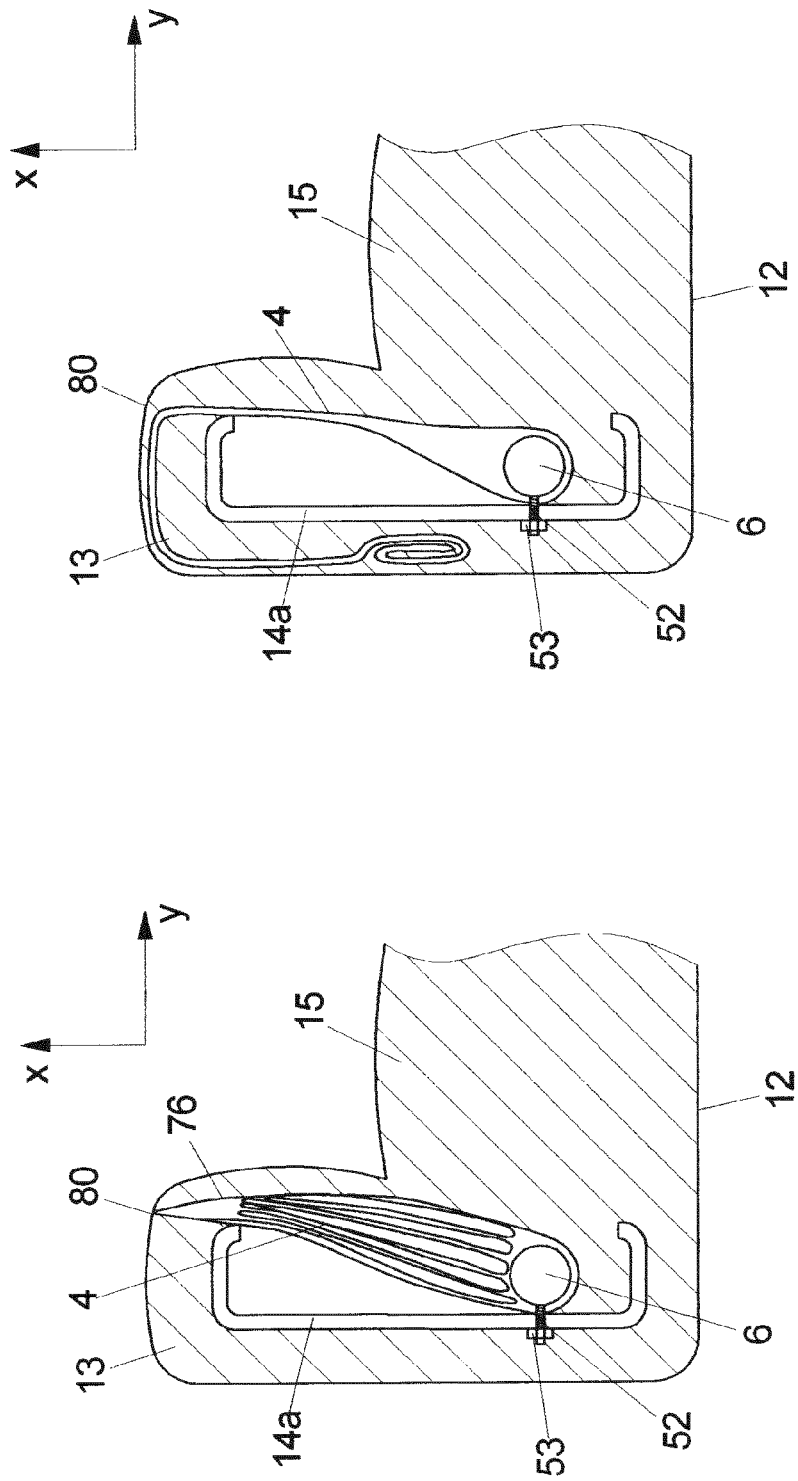

SIDE AIRBAG FOR MOTOR VEHICLES

CROSS-REFERENCE TO A RELATED APPLICATION

This application is a National Phase Patent Application of International Patent Application Number PCT/EP2013/077508, filed on Dec. 19, 2013, which claims priority of German Patent Application Number 10 2012 224 178.7, filed on Dec. 21, 2012.

BACKGROUND

This invention relates to a side airbag for motor vehicles.

A side airbag as mentioned above, which serves to protect vehicle occupants of a motor vehicle, comprises a gas bag which is to be arranged as intended on a vehicle seat, so that, in order to protect a vehicle occupant situated on the vehicle seat, it can be deployed laterally beside the vehicle occupant, and a gas generator for filling the gas bag with a gas, so that the same deploys.

The side airbag serves to protect the vehicle occupant against a collision with elements of the vehicle interior space or also with other vehicle occupants. In particular, the side airbag is designed to protect head and thorax of the vehicle occupant during an accident and as far as possible retain the vehicle occupant on the vehicle seat.

SUMMARY

Proceeding therefrom it is a problem underlying the invention to indicate a side airbag with an optimized restraining effect and a simple construction at the same time.

According to the invention, this problem is solved by the features as described herein.

Accordingly, the gas bag and the gas generator are configured and provided to be arranged on the vehicle seat such that at least in the deployed state the gas bag supports itself on a backrest frame of the vehicle seat. The gas bag can be in direct contact with the backrest frame and/or support on the backrest frame via a further backrest element, in particular a backrest cushion.

In the deployed state, the gas bag also can support on the backrest frame of the motor vehicle over a substantial part of its vertical extension (i.e. along the vertical vehicle axis/z-axis, based on the state mounted in a motor vehicle) or even substantially over its entire extension.

In the state of the associated vehicle seat mounted in a motor vehicle as intended, the gas bag advantageously supports itself on the backrest or on the backrest frame transversely to the longitudinal vehicle axis of the motor vehicle (along the so-called horizontal transverse vehicle axis/y-axis). According to one development, the gas bag also can support on the backrest or on the backrest frame against the direction of forward travel (along the so-called longitudinal vehicle axis/x-axis). For example, the backrest bolster and the vehicle occupant can be separated by the gas bag.

In particular, in a state mounted in a motor vehicle as intended, the gas bag can support on a (lateral) backrest bolster of the backrest transversely to the longitudinal vehicle axis of the motor vehicle. A back part of the vehicle seat can serve for additionally supporting the gas bag against the direction of forward travel.

Due to the support, the restraining effect of the gas bag is supported, in order to catch an impacting vehicle occupant in a defined manner. In addition, the support of the gas bag on the backrest frame effects that the bending stiffness of the deployed gas bag is increased.

Because of the support of the gas bag on the backrest frame according to the invention separate, additional means for supporting the side airbag, such as bracing or retaining straps, can be omitted. For fixing the side airbag at the backrest frame, the gas generator for example can include stay bolts. And holes can be provided in or on the backrest frame, which serve to accommodate the stay bolts. For example, the stay bolts extend through the holes and cooperate with fastening elements, in order to fix the side airbag at the backrest frame. The fastening elements cooperate with the stay bolts by positive or non-positive connection, for example.

The gas bag (in the inflated, deployed state) in particular can support (transversely to the direction of forward travel) on a side of the backrest frame of the vehicle seat facing the vehicle inner side, e.g. on an inside backrest bolster of the seat. It can thereby be prevented, for example, that during an accident the upper body of a vehicle occupant moves beyond the vehicle centerline, since the filled, laterally positioned gas bag counteracts such movement. At the same time, the probability of an inadvertent interaction of the gas bag with other vehicle elements, for example with the center console of the vehicle, is reduced by the support of the gas bag on the side of the backrest frame.

In that the gas bag in the deployed state mounted in the vehicle or in a vehicle seat as intended is arranged as close as possible to the vehicle occupant, a restraining effect is produced at an early stage when filling the same with gas, so that the vehicle occupant only can gain relatively little speed before impinging on the gas bag.

The gas bag can be sealed such that after filling with gas, it has a useful life of at least 5 seconds. To achieve such useful life, the gas bag must be sealed almost completely over a certain period. Due to such a long useful life, the side airbag can provide good protection also in rollover crash situations.

To lower the gas pressure in the interior space of the gas bag after a certain time, the invention can make use of the fact that the gas cools down after filling the gas bag. By cooling down it is achieved, for example, that 5 to 10 seconds after filling, the gas pressure regularly only amounts to 1.4 to 1.6 bar relative to the atmospheric pressure, and 1 minute after filling, the pressure has dropped substantially below 1 bar.

The gas generator is connected with the gas bag via a gas bag connection. The gas bag connection can be formed e.g. by at least one element separate from the gas bag envelope enclosing the interior space of the gas bag, which is fixed at the gas bag envelope, in particular on the side of the gas bag envelope facing away from the interior space of the gas bag. The gas bag connection advantageously is designed as flexible element which is fabricated e.g. of a textile fabric. It thereby becomes possible that different types of gas generators can be connected with a gas bag by using a gas bag connection of the same type.

The gas bag connection furthermore can be designed such that it loops around the gas generator. It can thereby be achieved that the gas bag connection and the gas bag (in the deployed state) positively surround the gas generator and fix the same in y-direction (i.e. along the horizontal transverse vehicle axis which extends transversely to the direction of travel of the motor vehicle). The gas generator thus can be clamped in the gas bag connection due to the gas bag pressure.

The gas bag connection can be fixed at the gas bag by means of a seam connection. To completely seal the gas bag, as mentioned above, it can furthermore be provided to seal the seam connection on the inside of the gas bag. For this purpose, a silicone layer advantageously is applied onto the seam connection. The silicone layer also can be heat-treated for curing.

The silicone layer in addition can be covered with a film. While fixing the gas bag connection at the gas bag envelope, this film in particular serves as protective film, in order to prevent that the gas bag layers stick together at the seam connection.

The gas bag connection can be kept so small in its dimensions that the seam connection is arranged in direct vicinity of the gas generator. This effects a particularly stable fixation of the gas generator and the gas bag (in particular also in the deployed state). It is, however, also possible that the gas bag connection is designed comparatively large and the seam connection is arranged at a greater distance to the gas generator.

Since at least two gas bag layers of the gas bag regularly are connected with each other by at least one circumferential seam for forming a gas bag envelope enclosing the interior space of the gas bag, the seam connection for fixing the gas bag connection at the gas bag advantageously can coincide with at least a part of this circumferential seam. Additional seam connections and sealing of the same then are not required.

Furthermore, the gas bag connection can at least partly be formed of gas bag layers which also serve to form the gas bag envelope. A circumferential seam which connects the gas bag layers with each other to form the gas bag envelope can separate the gas bag connection from the actual gas bag envelope enclosing the interior space of the gas bag. This means that the gas generator can be connected with the gas bag via a gas bag connection, which is formed by the gas bag layers provided for forming the gas bag envelope and which by the circumferential seam, which connects the gas bag layers with each other, is separated from that part of the gas bag layers which form the interior space of the gas bag envelope.

The gas bag connection can include through openings which are provided for fixing the gas generator. For example, stay bolts can reach through the through openings, so that in the state mounted in a vehicle seat as intended the gas bag connection can be clamped between the gas generator and the backrest frame of the vehicle seat.

The gas bag includes a channel with a gas bag opening, via which the gas flowing out of the gas generator is conducted into the gas bag. For this purpose, a filling hose can be provided. The filling hose can be introduced into the channel and the gas generator can be introduced into the filling hose surrounded by the channel. By means of the filling hose, the gas flowing out of the gas generator is collected and conducted into the gas bag along a specified direction.

Via fastening means, the filling hose and the channel can be connected with the gas generator in a gas-tight manner. The fastening means for example is at least one hose clamp.

The filling hose can be fabricated of a textile fabric. As compared to metal tubes which serve the deflection of the gas stream, weight and costs can be reduced thereby.

In addition, the gas bag can include tear seams which below a pressure limit value divide the gas bag into several sections and burst when this pressure limit value is reached or exceeded. After bursting of the tear seams, the entire interior space of the gas bag can be filled with gas. The gas generator can be arranged relative to the tear seams such that the gas from the gas generator initially flows into a portion which in the state of the side airbag mounted on a vehicle seat as intended corresponds to a thorax portion of the gas bag. Only after bursting of the tear seams will a further portion, e.g. the so-called head portion of the gas bag, be filled with gas. With movements requiring little space, the head portion of the gas bag thereby can be transferred from the folded state into the deployed state and subsequently be filled with gas. It herewith is achieved that the deployment of the gas bag by filling the same with gas requires little space and nevertheless an optimum protection of the vehicle occupant can be achieved. The entire gas bag can completely be filled with gas within 30 to 50 ms, preferably within 30 to 40 ms.

Alternatively, the tear seams also can be designed such that they divide the gas bag into more than two sections. Such an arrangement may be expedient when a deployment of the gas bag in smaller steps is required.

The tear seams for example are designed as glued seams, in particular as glued silicone seams.

For the reproducible deployment of the gas bag a pocket can be provided, which accommodates the gas bag in the folded state and which is arranged in a depression of the backrest. The pocket also serves to direct the gas bag into a defined direction, when the same is filled with gas. Advantageously, the pocket encloses the gas bag, namely for at least as long as the gas bag is folded. On deployment of the gas bag, the gas bag can tear open the pocket. The pocket torn open can ensure that the gas bag is deployed preferably in direction of a portion of the backrest which provides for the gas bag exiting from the backrest. Such portion for example has a weakened structure which as compared to other portions of the backrest has less tear strength. In particular, the weakened structure can be a seat tear line onto which the pocket torn open directs the deployed gas bag and through which the gas bag then can exit from the vehicle seat.

BRIEF DESCRIPTION OF THE DRAWINGS

The invention will be explained in detail below with reference to exemplary embodiments in conjunction with the drawings.

FIG. 1 shows a schematic representation of a side airbag with a deployed gas bag in a state mounted in a motor vehicle seat as intended from a first perspective.

FIG. 2 shows a schematic representation of the side airbag of FIG. 1 from a second perspective.

FIG. 3 shows a schematic representation of the side airbag of FIG. 1 with a gas bag connection according to a first embodiment for connecting a gas generator and the gas bag.

FIG. 4 shows a cross-section through the side airbag of FIG. 3 along the line IV-IV.

FIG. 8 shows a schematic representation of the side airbag of FIG. 1 with an inflated gas bag in the state mounted as intended with tear seams.

FIG. 9 shows a cross-section of the side airbag of FIG. 1 with a deployed gas bag in the state mounted in a motor vehicle seat as intended, wherein the side airbag according to a first variant is attached to the motor vehicle seat.

FIG. 10 shows a cross-section of the side airbag of FIG. 1 with a deployed gas bag in the state mounted in a motor vehicle seat as intended, wherein the side airbag according to a second variant is attached to the motor vehicle seat.

FIG. 12 shows a cross-section of a side airbag with a gas bag folded according to a first variant in the state mounted in a motor vehicle seat as intended.

FIG. 13 shows a cross-section of a side airbag with a gas bag folded according to a second variant in the state mounted in a motor vehicle seat as intended.

DETAILED DESCRIPTION

Figure 5:
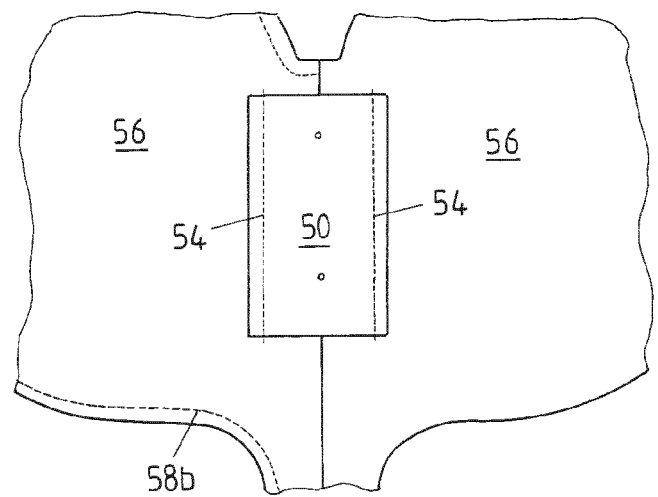
FIG. 5 shows a schematic representation of the gas bag envelope of the gas bag of FIG. 4 together with the gas bag connection in a state of the gas bag envelope folded apart.

FIGS. 1 and 2 schematically show a side airbag 2 according to an embodiment of the invention in the state mounted in a motor vehicle as intended from two different perspectives. The side airbag 2 comprises a gas bag 4 and a gas generator 6. In FIGS. 1 and 2, the gas bag 4 is shown in a deployed state (filled with gas) and extends in a plane which substantially is parallel to a longitudinal vehicle axis x and a vertical vehicle axis z and is vertical to a horizontal transverse vehicle axis y of the motor vehicle. It includes a gas bag envelope 8 which encloses an interior space 10 of the gas bag 4 (see FIG. 4).

In the exemplary embodiment, the gas bag 4 and the gas generator 6 are arranged on a vehicle seat 12. The gas bag 4 and the gas generator 6 are arranged on the vehicle seat 12 such that in the deployed state the gas bag 4 supports itself on a backrest 11 of the vehicle seat 12. In the exemplary embodiment, the support substantially is effected along a vertical extension of the gas bag 4 (based on the state mounted in a vehicle as intended). Furthermore, the gas bag 4 supports itself on the backrest 11 substantially along its entire vertical extension (extension along the vertical vehicle axis z). In particular, the gas bag 4 supports itself on a side of the backrest 11 of the vehicle seat 12 facing the vehicle interior space. The side of the seat or the backrest facing the vehicle interior space is understood to be that side which is located opposite the side of the seat/backrest directly facing the lateral body (and instead faces an adjacent seat).

As shown in FIGS. 9 and 10, the gas bag 4—based on the state of the associated seat mounted in a motor vehicle as intended—laterally supports itself on a backrest bolster 13 of the backrest 11 with its side facing away from the vehicle occupant (along the horizontal transverse vehicle axis y). In the exemplary embodiment, the gas bag 4 with that side in particular directly supports itself on a backrest frame 14 which is part of the basic structure of the backrest 11. In addition, a support of the gas bag (along the longitudinal vehicle axis x) is effected on a back part 15 (shown without the associated rear supporting structure) of the vehicle seat 12.

In the state mounted as intended, the gas bag 4 serves to protect a vehicle occupant situated on the vehicle seat 12 and can be deployed laterally beside the vehicle occupant. The gas generator 6 serves for filling the gas bag 4 with a gas, so that the gas bag 4 is deployed.

The side airbag 2 comprises a gas bag connection 50, by which the gas generator 6 and the gas bag 4 are connected with each other (see FIG. 3). The gas bag connection 50 is designed as an element separate from the gas bag envelope 8. In the present case, it concretely is formed as tab which is attached to the gas bag envelope 8 and serves for accommodating the gas generator 6. The gas bag connection 50 is flexible and fabricated e.g. of textile fabric, namely according to one variant of the same fabric as the gas bag envelope 8.

To connect the gas generator 6 and the gas bag 4 with each other, the gas bag connection 50 loops around the gas generator 6. The gas bag connection 50 advantageously is put around the gas generator 6 such that in the deployed state of the gas bag 4 the gas generator 6 is pressed against the gas bag 4 by the gas bag connection 50. This results in a relative fixation of the gas generator 6 and the gas bag 4 in direction of the transverse vehicle axis y.

Figure 6:
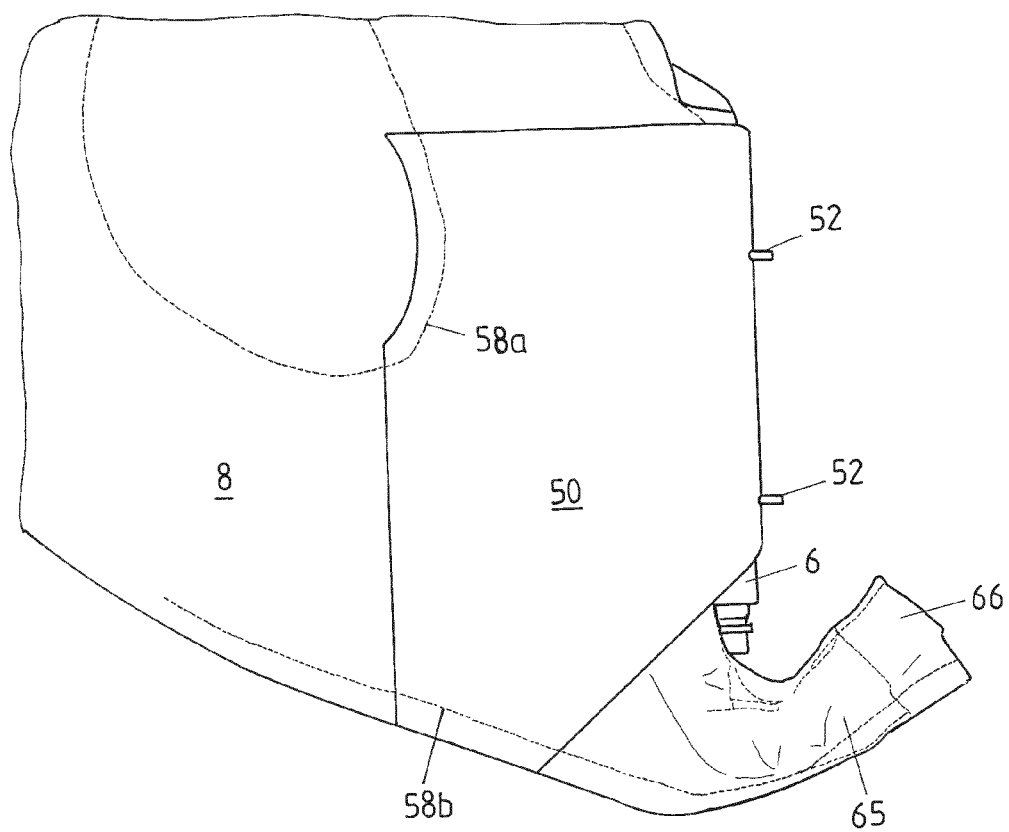
FIG. 6 shows a schematic representation of the side airbag of FIG. 1 with a gas bag connection according to a second embodiment for connecting the gas generator and the gas bag.

According to one embodiment, the gas generator 6 includes stay bolts 52 (see FIGS. 3, 4 and 6) which are provided, in order to attach the side airbag 2 to the backrest frame 14. The stay bolts 52 are arranged on a side of the gas generator 6 which faces away from the gas bag 4. As shown in FIGS. 9 and 10, the stay bolts 52 are attached to the backrest frame 14 of the vehicle seat 12. For this purpose holes are provided in the backrest frame 14, through which the stay bolts 52 extend. The stay bolts 52 cooperate with fastening elements 53, in order to fix the side airbag 2 at the backrest frame 14. The fastening elements 53 cooperate with the stay bolts 52 by positive or non-positive connection, for example.

According to the embodiment shown in FIG. 9, the stay bolts 52 reach through a portion 14a of the backrest frame 14 which substantially extends parallel to the longitudinal vehicle axis x of the motor vehicle. The stay bolts 52 extend transversely to the longitudinal vehicle axis x of the motor vehicle.

According to the embodiment shown in FIG. 10, the stay bolts 52 reach through a portion 14b of the backrest frame 14 which substantially extends transversely to the longitudinal vehicle axis x of the motor vehicle. The stay bolts 52 extend parallel to the longitudinal vehicle axis x of the motor vehicle.

By means of a seam connection 54, the gas bag connection 50 is fixed on the side of the gas bag envelope 8 facing away from the interior space 10 of the gas bag 4. To ensure that the gas bag envelope 8 also is gas-tight at the seam connection 54, the seam connection 54 is covered with a silicone layer (not shown) on the side of the gas bag envelope 8 facing the interior space 10 of the gas bag 4. The silicone layer in turn can be covered with a film (not shown). Preferably, the film is a non-adhesive plastic film which even under the influence of heat does not change its adhesive behavior. For example, it is fabricated of a polyolefin plastic.

According to a first configuration of the gas bag connection 50 (see FIGS. 3-5) the same is formed of a flat fabric whose size substantially corresponds to the peripheral surface of the gas generator 6. The flat fabric is dimensioned such that it can enclose the gas generator 6 together with the gas bag envelope 8 and also can be attached to the gas bag envelope 8. In the exemplary embodiment shown in FIGS. 3 to 5 the flat fabric of the gas bag connection 50 substantially is rectangular (independent of the shape of the gas bag envelope 8). The seam connection 54 comprises one seam each on the left and on the right of the gas generator 6 and is arranged in direct vicinity of the gas generator 6. The volume which is enclosed by the gas bag connection 50 and the gas bag envelope 8 accordingly substantially corresponds to the volume of the gas generator 6.

According to a second embodiment of the gas bag connection 50 (see FIG. 6) the same is formed of a flat fabric whose size and shape are dependent on the gas bag envelope 8, among other things. The second embodiment of the gas bag connection 50 makes use of the fact that the gas bag envelope 8 regularly comprises at least two gas bag layers 56 which are connected with each other by at least one circumferential seam 58, in order to close the interior space 10 of the gas bag envelope 8. The circumferential seam 58 is sealed by a silicone layer. The second embodiment of the gas bag connection 50 substantially differs from the first embodiment in that the seam connection 54 is not arranged in direct vicinity of the gas generator 6, but coincides with at least a part of the circumferential seam 58. The seams arranged on the left and right of the gas generator 6 also coincide. For forming the seam connection 54 at least a part of the circumferential seam 58 is chosen, which is arranged relative to the gas generator 6 such that in the deployed state of the gas bag 4 shear forces occur, which ensure a relative fixation of the gas generator 6 and the gas bag 4. The volume which is enclosed by the gas bag connection 50 and the gas bag envelope 8 substantially corresponds to the volume of the corresponding portion of the gas bag envelope 8.

Figure 11:
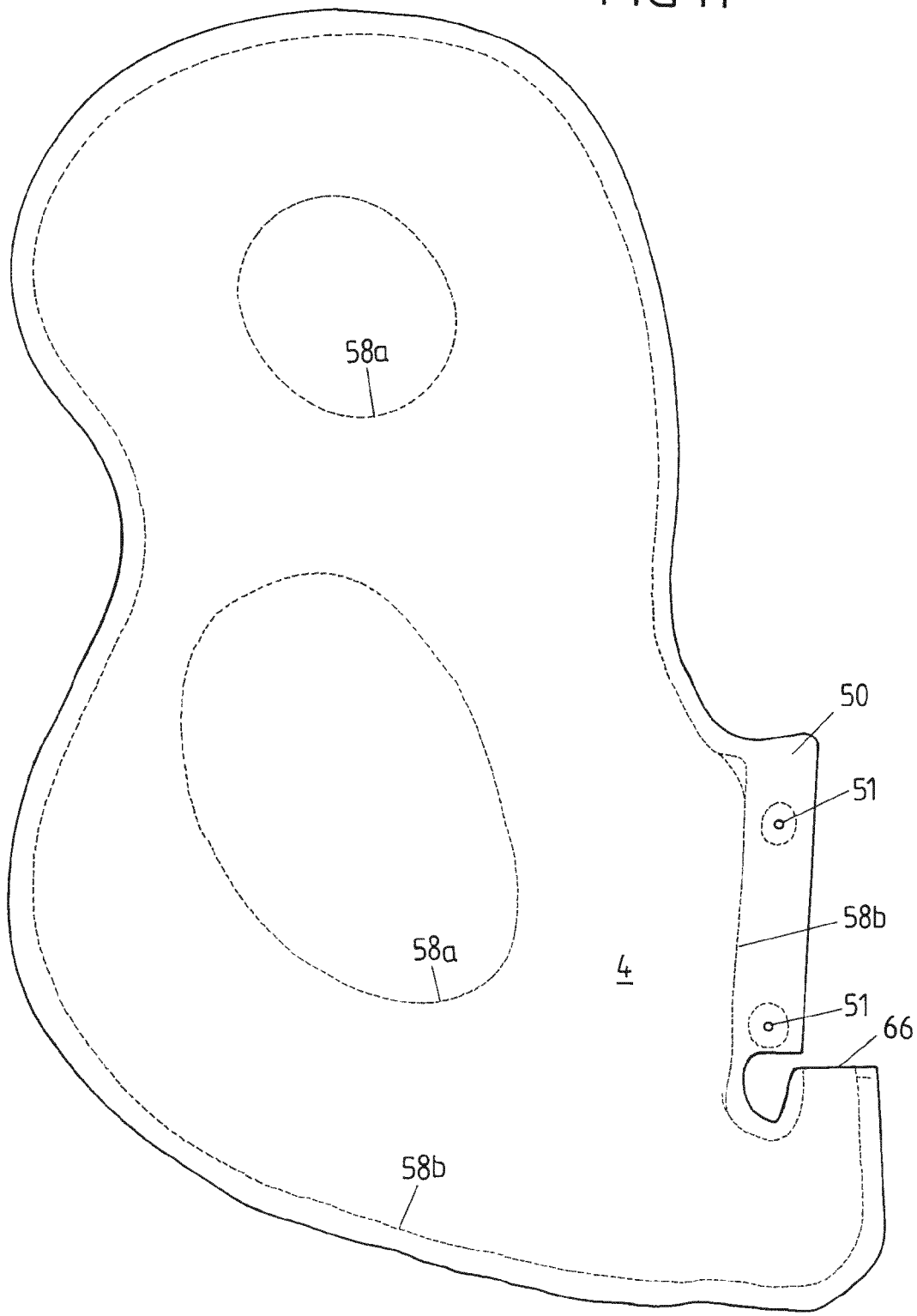
FIG. 11 shows a schematic representation of the side airbag of FIG. 1 with a gas bag connection according to a third embodiment for connecting the gas generator and the gas bag.

According to a third embodiment of the gas bag connection 50 (see FIG. 11), the gas bag connection 50 is formed of gas bag layers 56 of the gas bag 4. The circumferential seam 58b separates the gas bag connection 50 from the part of the gas bag layers 56 which enclose the interior space 10 of the gas bag envelope 8. The gas bag connection 50 is formed as oblong strip of the gas bag layers 56, whose length and width substantially correspond to the length and width of the gas generator 6. The gas bag connection 50 comprises through openings 51 which are provided for accommodating the stay bolts 52 of the gas generator 6. In particular, the stay bolts 52 reach through the through openings 51, so that in the state mounted in a vehicle seat 12 as intended the gas bag connection 50 is clamped between the gas generator 6 and the backrest frame 14 of the vehicle seat 12. In the exemplary embodiment shown in FIG. 11, two through openings 51 are provided.

Figure 7:
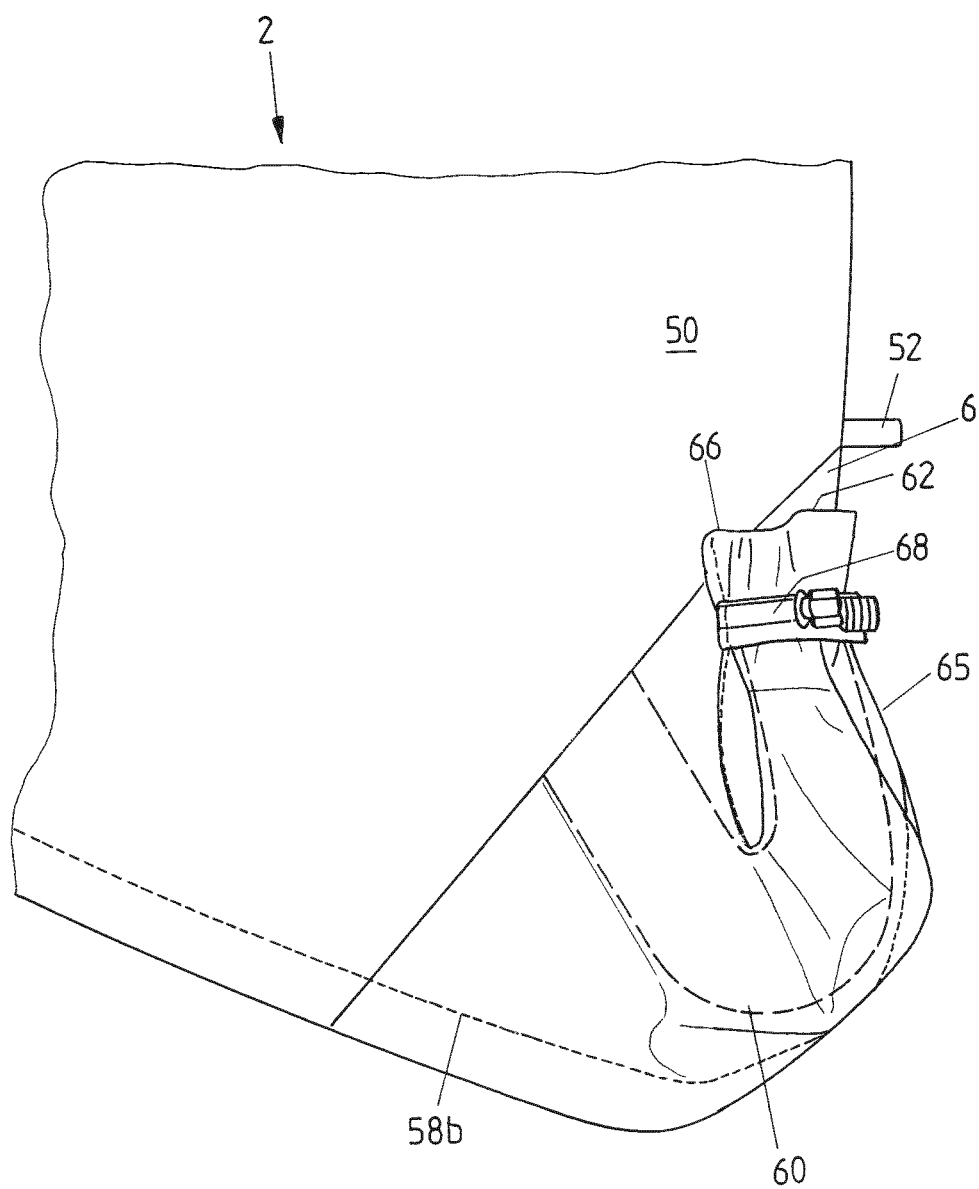
FIG. 7 shows a schematic representation of the side airbag of FIG. 1 with a filling hose.

The side airbag 2 furthermore can comprise a filling hose 60 (see FIG. 7). The filling hose 60 has a first end 62 and a second end 64 and is provided for conducting the gas flowing out of the gas generator 6 along a specified direction into the gas bag 4. For this purpose, the filling hose 60 is arranged in a channel 65 of the gas bag 4. The channel 65 comprises a gas bag opening 66 through which the gas generator 6 extends into the channel 65. Accordingly, the filling hose 60 accommodates the gas generator and is in fluid connection with the gas bag 4, in that the second end 64 of the filling hose 60 extends into the gas bag 4.

By way of example, FIG. 7 shows a side airbag 2 with a gas bag connection 50 according to the second embodiment. However, the filling hose 60 likewise can be combined with a gas bag connection 50 according to one of the other embodiments. The filling hose 60 is fabricated of a textile fabric. Preferably, the fabric is the fabric of which the gas bag envelope 8, too, is fabricated. A fastening means 68 is provided at or in the vicinity of the first end 62 of the filling hose 60, in order to connect the filling hose 60 with the gas generator 6 in a gas-tight manner. In the exemplary embodiment, the fastening means 68 is designed as hose clamp.

The side airbag 2 furthermore can include one or more tear seams 70 (see FIG. 8), which connect the gas bag layers 56 with each other and extend within the region defined by the circumferential seams 58. The tear seams 70 are arranged such that in the deployed state they can divide the interior space 10 of the gas bag 4 into two or more portions. The connection between the gas bag layers 56 by the tear seams 70 is not durable, but only exists below a fixed pressure limit value. When the pressure limit value is reached or exceeded, when the gas bag 4 is filled with a gas, the tear seams 70 will burst. The tear seams 70 therefore are designed here as glued silicone seams.

FIG. 8 by way of example shows two tear seams 70 which each extend between an inner circumferential seam 58a and an outer circumferential seam 58b and divide the interior space 10 of the gas bag 4 into two portions. In the state of the side airbag 2 mounted on a vehicle seat 12 as intended the one portion, as a thorax portion 72, is located at the height of the thorax region of a vehicle occupant to be protected and the other portion, as a head portion 74, is located at the height of the head region of the vehicle occupant.

The side airbag 2 furthermore can comprise a pocket 76 (see FIG. 12). The pocket 76 serves to accommodate the gas bag 4 in the folded state and also serves to direct the gas bag 4 into a defined direction when the same is filled with a gas.

Advantageously, the gas bag 4 is sealed such that, after a certain (specifiable) internal pressure has been reached in the interior space 10 of the gas bag 4, it has a useful life of at least three seconds, in particular of at least five seconds.

FIGS. 12 and 13 illustrate two possibilities for the arrangement of the folded gas bag 4 in the backrest bolster 13 of a vehicle seat 12. In both embodiments, the stay bolts 52 by way of example (based on the longitudinal vehicle axis x) in the rear part reach through the portion 14a of the backrest frame 14 which extends substantially parallel to the longitudinal vehicle axis x of the motor vehicle. Alternatively, the stay bolts 52 can reach through the backrest frame 14 at other points.

In the embodiment shown in FIG. 12, the gas bag 4 is folded to a bundle and arranged between the back part 15 of the backrest 11 and the backrest frame 14. The folded gas bag 4 is stowed in a pocket 76 which upon deployment directs the gas bag 4 onto a seat tear line 80, through which the gas bag 4 then can exit from the vehicle seat 12. The pocket 76 directly rests against the backrest frame 14.

In the embodiment shown in FIG. 13 a first portion of the gas bag 4, which is opposed to a second portion of the gas bag 4, to which the gas generator 6 is attached, is rolled up. The gas bag 4 rolled up in this way extends substantially parallel to the vertical vehicle axis z (based on the state of the side airbag mounted in a motor vehicle). The gas bag 4 rolled up in this way envelops the backrest frame 14 in a U-shaped manner. Based on the longitudinal vehicle axis x, the gas bag 4 extends from the point at which it is attached to the backrest frame 14 towards the seat tear line 80 in the backrest bolster 13, from where the gas bag 4 reverses its direction following the outer shape of the backrest bolster 13. This convolution for example provides for uniformly distributing the volume of the folded gas bag 4 in the backrest bolster 13.

Depending on the construction of the backrest 11 of the vehicle seat 12, the one or the other arrangement can be chosen.

Figure 14:
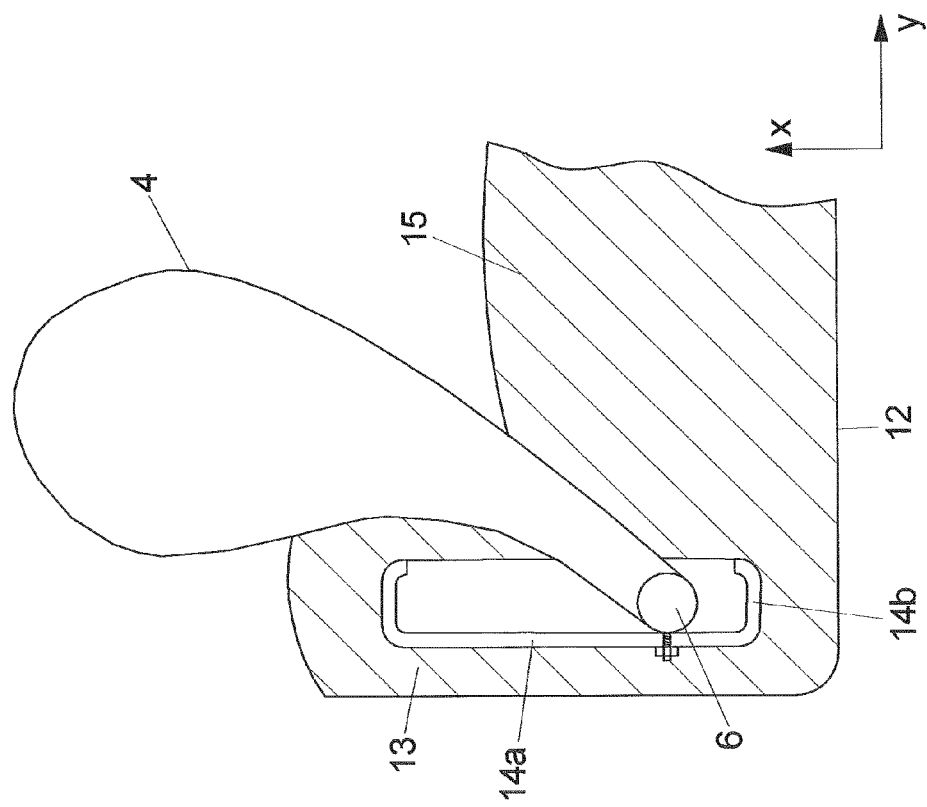
FIG. 14 shows a cross-section of the side airbag of FIG. 1 with a deployed gas bag in the state mounted in a motor vehicle seat as intended, wherein the side airbag according to a first variant is attached to the motor vehicle seat and indirectly supports itself on the backrest frame.

The embodiment shown in FIG. 14 substantially corresponds to the embodiment of FIG. 9. In FIG. 14, however, the inflated gas bag 4 indirectly supports itself on the backrest frame 14 of the vehicle seat 12. In particular, a part of the backrest cushion of the backrest bolster 13 is provided between the backrest frame 14 and the inflated gas bag 4.

The indirect support of the gas bag 4 accordingly is effected indirectly via the backrest cushion of the backrest bolster 13 on the backrest frame 14.

Figure 15:
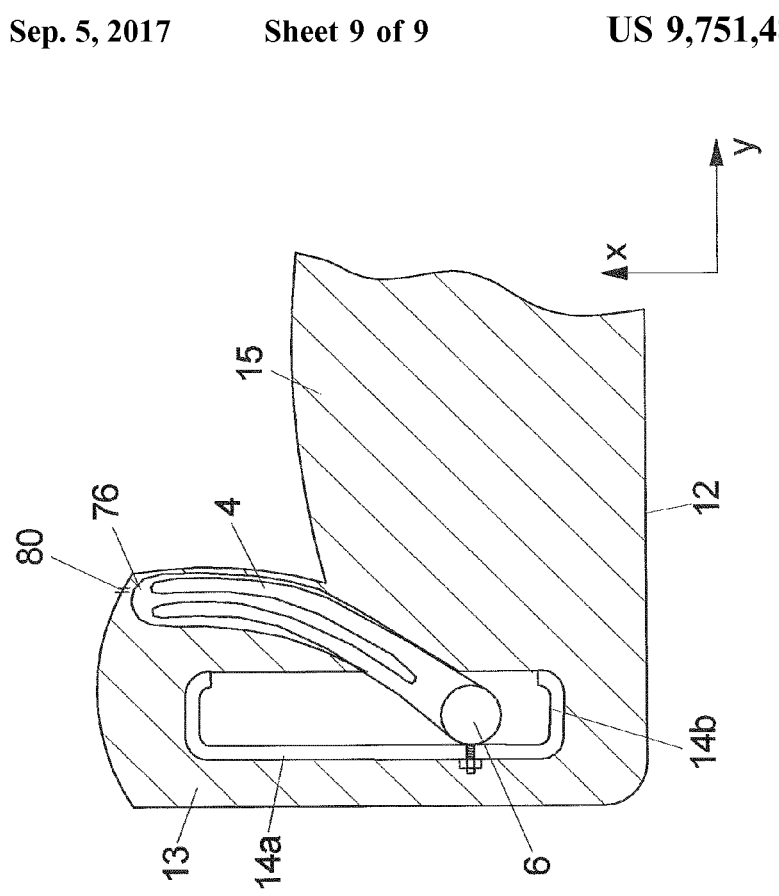
FIG. 15 shows a cross-section of the side airbag from the embodiment of FIG. 14 with a folded gas bag.

In FIG. 15, the embodiment of FIG. 14 is shown, wherein the gas bag 4 is in a folded state. The folded gas bag 4 is stowed in a pocket 76 which upon deployment directs the gas bag 4 onto a seat tear line 80, through which the gas bag 4 then can exit from the vehicle seat 12. Between this pocket 76 and the backrest 14, a part of the backrest cushion of the backrest bolster 13 is provided.

For the fixation (as gas-tight as possible in the end) of the gas bag connection 50 at the gas bag envelope 8, the gas bag connection 50 is positioned on its side facing away from the interior space 10 and fixed there by means of a seam connection 54. Since the seam connection 54 in this form is not yet gas-tight with sufficient certainty, the seam connection 54 is covered with a silicone layer on the side of the gas bag envelope 8 facing the interior space 10. The silicone layer can be covered with a plastic film (e.g. of a polyolefin plastic), in particular to prevent that the silicone (which then in particular is not a thermally curing silicone) undesirably adheres to regions of the gas bag envelope 8 or to other components cooperating with the gas bag.

To achieve an optimally sealing effect of the silicone layer, the silicone layer can be heat-treated (e.g. by contact with a heating device). Due to the heat treatment, the silicone starts to melt and can uniformly spread on and in the seam connection 54. In particular, there is used a thermally curing silicone (HCS—hot curing silicone).

In the end, a gas-tight attachment of the gas bag connection 50 to the gas bag envelope 8 is obtained.

The invention claimed is:

1. A side airbag for a motor vehicle, comprising
a gas bag which is to be arranged as intended on a vehicle seat, so that, in order to protect a vehicle occupant situated on the vehicle seat, it can be deployed laterally beside the vehicle occupant, and
a gas generator for filling the gas bag with a gas, so that the same deploys,
wherein the gas bag comprises a head portion and a thorax portion for protection of head and thorax of the vehicle occupant,
wherein the gas bag and the gas generator are configured and provided to be arranged on the vehicle seat such that in the deployed state the gas bag extends between a backrest bolster and the vehicle occupant and supports itself on a backrest frame of the vehicle seat, the backrest bolster and a back part of the vehicle seat, and wherein the gas generator is arranged on an interior side of the backrest frame.

2. The side airbag according to claim 1, wherein the gas bag supports itself on a side of the backrest frame of the vehicle seat facing the vehicle interior space or an adjacent vehicle seat.

3. The side airbag according to claim 1, wherein in the deployed state the gas bag directly supports itself on the backrest frame of the vehicle seat or indirectly via a part of a backrest cushion on the backrest frame of the vehicle seat.

4. The side airbag according to claim 1, wherein the gas bag, based on the state of the vehicle seat mounted in a motor vehicle as intended, supports itself on the backrest frame of the vehicle seat transversely to the direction of forward travel of the motor vehicle.

5. The side airbag according to claim 1, wherein the gas bag supports itself on the backrest frame of the vehicle seat substantially along its entire vertical extension.

6. The side airbag according to claim 1, wherein the gas generator is connected with the gas bag via a gas bag connection, which is formed by at least one flexible element separate from a gas bag envelope surrounding the interior space of the gas bag, which is fixed at the gas bag envelope.

7. The side airbag according to claim 6, wherein the gas bag connection loops around the gas generator.

8. The side airbag according to claim 6, wherein the gas bag connection is fabricated of a textile fabric.

9. The side airbag according to claim 6, wherein the gas bag connection is fixed at the gas bag by means of a seam connection.

10. The side airbag according to claim 9, wherein the seam connection is arranged in direct vicinity of the gas generator.

11. The side airbag according to claim 9, wherein the gas bag comprises two gas bag layers which for forming a gas bag envelope enclosing the interior space of the gas bag are connected with each other via at least one circumferential seam, and that the seam connection for fixing the gas bag connection at the gas bag coincides with at least a part of the circumferential seam.

12. The side airbag according to claim 1, wherein the gas bag includes a channel with a gas bag opening and that a filling hose is provided, which accommodates the gas generator and is in fluid connection with the gas bag and which serves to conduct the gas flowing out of the gas generator along a specified direction into the gas bag.

13. The side airbag according to claim 1, wherein the gas bag includes tear seams which below a pressure limit value divide the gas bag into several portions and burst when this pressure limit value is reached or exceeded.

14. The side airbag according to claim 1, wherein a pocket is provided, which encloses the gas bag in a folded state and which serves to direct the gas bag into a defined direction, when the same is filled with gas.

* * * * *